UNITED STATES PATENT OFFICE.

DAVID McGUGIN, JASPER R. LYBARGER, AND FRANCIS M. HIBBETS, OF KNOX COUNTY, OHIO.

IMPROVEMENT IN CLEANING COMPOUNDS.

Specification forming part of Letters Patent No. 170,682, dated December 7, 1875; application filed September 15, 1875.

*To all whom it may concern:*

Be it known that we, DAVID McGUGIN, JASPER R. LYBARGER, and FRANCIS M. HIBBETS, of the county of Knox and State of Ohio, have invented a certain Cleaning Compound, to be used instead of soap in cleansing clothing, washing of wool and raw silk in the preparation for manufacturing, and for use in all cases where grease, oils, or resins are to be eradicated, of which the following is a specification:

This invention relates to that class of compounds used to wash clothing, to cleanse wool in its preparation for manufacture, and for all other purposes for which soap is used, as well as for the destruction of gum and resinous substances which collect about machinery; and it consists in a composition formed by mixing sal-soda, potash, refined borax, grease or oil, sulphate of soda, benzine, ammonia, and water.

To prepare the "American Cleansing Compound" take four gallons soft water, one pound sal-soda, and one pound of Babbitt's or any other pure concentrated potash; put into a clean iron or tin kettle, and boil until the soda and potash are dissolved. Then add three pounds of clean grease, tallow, or fatty oil, and boil until the grease has become thoroughly mixed with the potash, and the mixture becomes thick and ropy, which will take from two to five hours, owing to the quality of grease used. Keep filling up with water to supply the loss from evaporation, and do not allow it to boil away. When the grease has become thoroughly assimilated, then add six gallons soft water, one-half pound refined borax, one-half pound "F F F" aqua-ammonia, and two ounces benzine, and let the mass come to a boil, stirring the meantime, and then add two ounces sulphate of soda, and continue the boiling and stirring for two or three minutes, and the compound is ready for use.

This particular combination, owing to the small amount of grease used in proportion to alkalines, renders its saponifying properties much greater than that of any soap or compound of which we have any knowledge, and the borax, ammonia, and benzine prevent the alkalines from destroying the texture or colors of fabrics.

To make use of our invention for the purpose of washing clothing or fabrics, usually immersed in water, take one pint of the compound, dissolved in hot water, for the quantity of clothing which could be covered by four gallons of water. Allow the articles to soak in the water from one to three hours, after which wring them, and they will usually be found perfectly cleansed.

Having thus described our invention, what we claim as new, and desire to secure by Letters Patent, is—

The cleansing compound described, consisting of sal-soda, potash, borax, grease or oil, sulphate of soda, benzine, and ammonia, substantially in the proportions named.

DAVID McGUGIN.
JASPER R. LYBARGER.
FRANCIS M. HIBBETS.

Witnesses:
ASHER T. MITCHELL,
SAMUEL BARTLETT.